Sept. 4, 1951 T. H. CLINE 2,566,553
WARMING OVEN
Filed Feb. 2, 1948 2 Sheets-Sheet 1
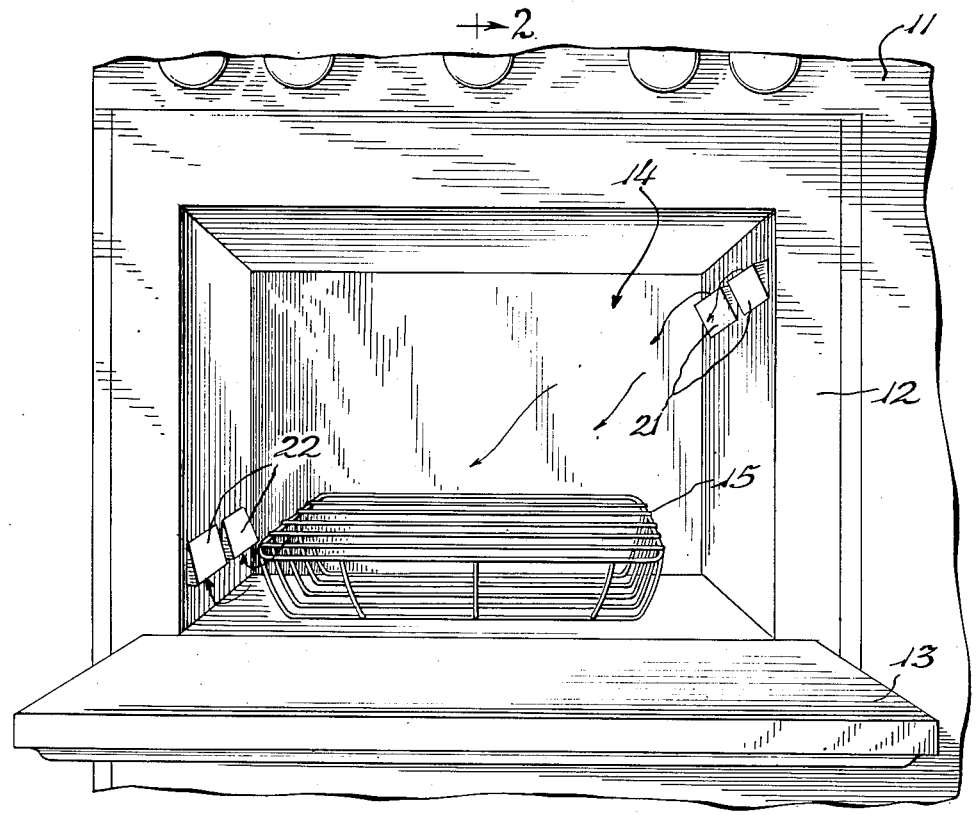
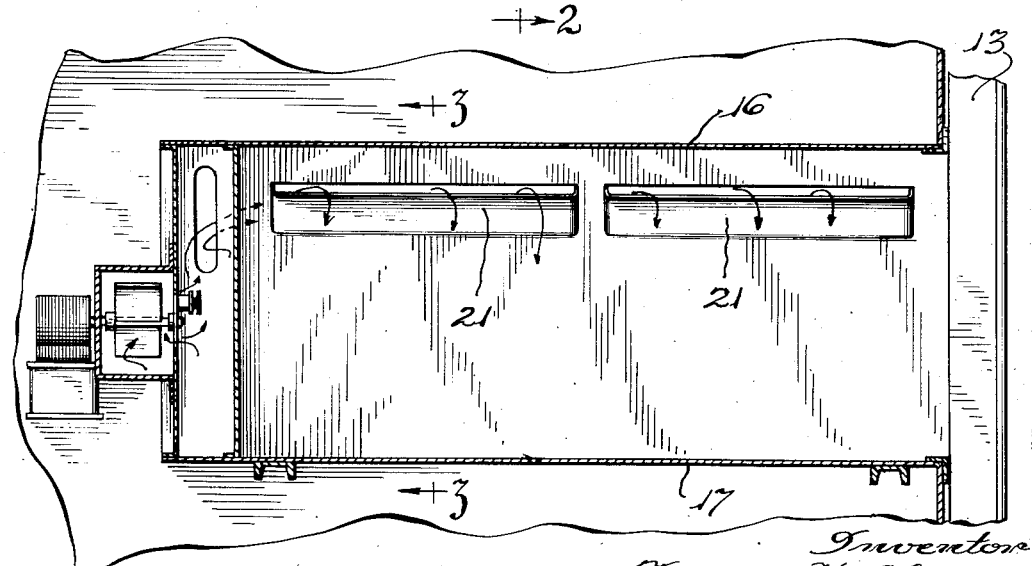

Sept. 4, 1951 T. H. CLINE 2,566,553
WARMING OVEN
Filed Feb. 2, 1948 2 Sheets-Sheet 2

Inventor
Truman H. Cline
By
attorneys

Patented Sept. 4, 1951

2,566,553

UNITED STATES PATENT OFFICE 2,566,553

WARMING OVEN

Truman H. Cline, Newark, Ohio, assignor to Sears, Roebuck and Co., Chicago, Ill., a corporation of New York Application February 2, 1948, Serial No. 5,860

1 Claim. (Cl. 126—273)

The present invention relates to an apparatus and system for compartment heating and is concerned more particularly with a chamber adjunct to a larger apparatus, such as a kitchen range which may be employed for the purpose of warming serving dishes or processed food preparatory to serving.

In accomplished cuisine service it is a well recognized practice to previously warm platters, trays and/or serving dishes to a temperature comparable with that of the food. Also, it is sometimes desirable to maintain moderately warm temperatures of prepared food while awaiting its course of serving.

In keeping with the desirability of these practices, it is proposed herewith to provide an apparatus which may be built into the overall structure of a kitchen range, and one which is particularly adapted to electrically operated kitchen ranges whereby a chamber is provided within which there may be received serving dishes and other articles as aforesaid to be maintained at moderate temperature ranges, such as between 120°-140°. This compartment may be constructed of a metallic liner preferably insulated for the sake of efficiency and provided with electric heating and a circulating system for moving the air continuously so as to maintain evenness of temperature in the chamber throughout, and so as to prevent local hot spots which might result in crazing or otherwise deteriorating the vessels or adversely affecting the food contained therein. Since the principal purpose of this type of adjunct is one of warming dinner plates, saucers and other articles of tableware, there is provided in connection with this chamber an appropriate nesting basket whereby individual dishes may be kept spaced apart and supported in suitable position for easy accessibility in keeping with good culinary practices.

Briefly stated, the principal object of the present invention is the provision of an apparatus affording a closed chamber and evenly distributed heat circulation therefor at temperature ranges appropriate for warming or maintaining warm dishes and/or food preparatory to table service.

For a better understanding of the teachings hereof, reference will now be had to the accompanying drawings and to the following detailed specification in which like reference characters denote corresponding parts throughout; and in which, Fig. 1 is a frontal perspective view of an oven warming chamber installed as an adjunct to a kitchen range with its door ajar to reveal the interior appearance and disposition of parts;

Fig. 2 is a transverse sectional view taken approximately on line 2—2 of Fig. 1;

Figure 3:
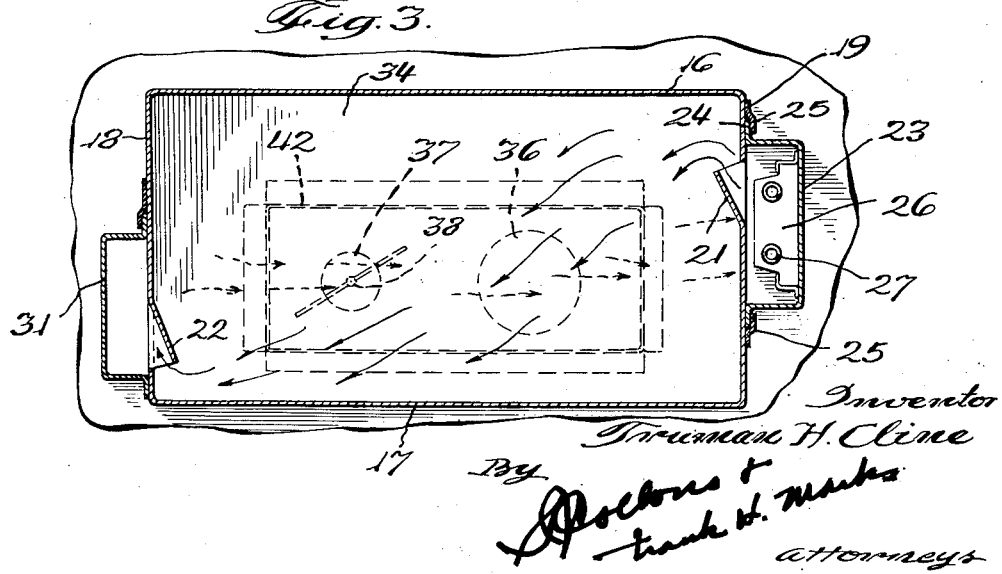
Fig. 3 is a transverse sectional view through the oven chamber and the heat coil containing compartments and is taken approximately on line 3—3 of Fig. 2.

The front of a kitchen range generally designated 11 is illustrated in Fig. 1 as being fitted with a rectangular frame 12 slightly recessed for closure by a door 13 or otherwise so as to be accessible in the same manner that oven compartments are accessible in these classes of apparatus. The warming chamber is of appropriate rectangular dimensions to receive in quantity serving platters and other tableware (not shown) either stacked in poised inclination within the spaces of a wire basket-type holder 15, or when laden with food in the usual upright manner. The top wall 16 and bottom wall 17 in the illustrations of Figs. 2 and 3 are indicated as freely projected, although it will be understood that in keeping with heating efficiency these walls may be surrounded with insulation material such as rock wool batting or spun glass as is well known.

Figure 4:
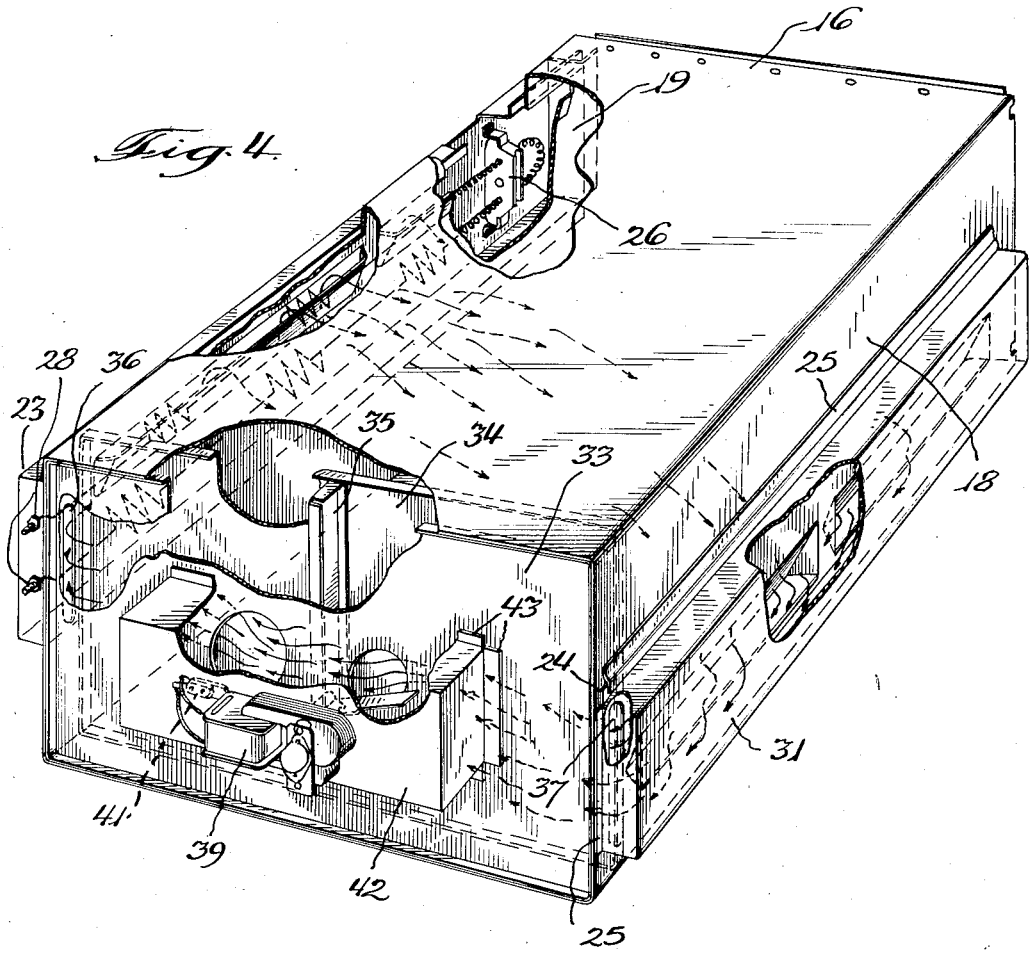
Fig. 4 is a downwardly and rearwardly viewed perspective partially in phantom of the apparatus featured in Figs. 1-3 with portions of the oven chamber broken away to reveal various details of construction.

The side walls 18 and 19 may be similarly treated and each of these is provided with louvre openings as a result of the metallic strike-outs 21 and 22. Behind the strike-out 21 there may be noted in Fig. 4 a rectangular pan enclosure 23 provided with flanges 24 whereby the pan is longitudinally slideable into and out of the track ways 25, top and bottom. To limit and confine the pan 23 an end stop 25 has been secured at the rear of the rectangular enclosure. Within the pan 23 there are supported a plurality of insulation blocks 26 which carry a coil of electric resistance wire connected with a line source through terminal screw connecting posts such as those indicated 28 in Fig. 4.

The louvres 21 which are struck from the wall 19 will be observed to open upwardly directing their flow channels towards the top wall 16 at a noted angle of inclination while the louvres 22 in diametric opposite manner direct their openings downwardly at about the same degree of inclination and against the bottom wall 17. A pan 31 similar to the one noted 23 and described above is correspondingly supported on the wall 18. The pan 31 is simply a space chamber and is not provided with a heating coil as in the case of pan 23.

At the rear of the warming oven enclosure there is to be noted a co-extensive spaced chamber enclosed between the end wall 33 and the wall 34 which closes one end of the warming chamber. The described end space is vertically partitioned by a flanged plate 35 centrally located and communicates with the chambers of the pans 23 and 31 by reason of the slotted openings 36 and 37 in registration therewith respectively.

The end wall 33 is provided with two different sized circular openings designated 36 and 37, the former communicating with one-half of the partitioned space adjacent the heated pan 23, and the latter communicating with the other half of the partitioned space associated with the non-heated pan 31. Accordingly, the air travel as best indicated by the air flow arrows in Fig. 4 constitutes a circulation of heated air forced out of the louvres 21 and produced by the radiations of the resistance wire 27, thence downwardly through the warming chamber 14 and drawn out through the louvres 22 into the non-heated pan 31 which will thus be observed to be functioning as an exhaust flue. The air then passes through the opening 37 into the partitioned space adjacent thereto and defined by the end walls 33 and 34. This air is then drawn through the smaller opening 37 into a fan chamber under the stimulus of a simple centrifugal circulating fan 38 driven by an electric motor 39 as best viewed in Fig. 4. The draft is then forced out through the larger opening 36 into the other half of the divided space and directed into the slot 36 which communicates with the heating chamber of pan 23.

Thus, there is described a continuous flow circulating system designed to make certain that all of the air within the chamber 14 is maintained in motion and at an even temperature according to predetermined setting.

Towards this end, there is provided a thermostatically responsive contact pair 41 in the chamber defined by the end pan 42 within which the centrifugal propeller or fan unit 38 is located. The contacts 41 are arranged so as to open when the heat passing through the chamber of pan 42 rises above that of a predetermined setting and to close when such heat falls below a somewhat lower setting. This contact pair is accordingly located in the service circuit ahead of the heating coil 27, but exclusive of that portion of the circuit which powers the motor 39. The manner of circuit arrangement for this accommodation is commonly understood by artisans in the field of electrically controlled systems. The rectangular pan 42 has been indicated as permanently secured by its flanges 43 to the end wall 33 as by spot welding, riveting or bolting.

While the present invention has been explained and described with reference to a specific embodiment, it will be understood, nevertheless, that numerous variations and modifications may be incorporated thereinto without departing from the essential spirit or scope thereof. Accordingly, it is not intended that the invention be limited in its understanding to any of the details featured in the accompanying drawings nor to the particular language employed in the foregoing description, except as indicated in the hereunto appended claim.

The invention claimed is:

In a warming oven for electric ranges, a rectangular sheet metal housing defining a principal warming chamber having side, top, bottom and end walls, a secondary chamber co-extensive with the end wall vertically partitioned into two end sub-chambers, a heat unit having communication with said principal warming chamber through louvre orifices at the top of one of said side walls, an exhaust flue defining enclosure having communication with said warming chamber through louvre openings at the bottom of the other of said side walls, each said heating unit and exhaust flues having communication respectively with an adjacent one of said end wall sub-chambers and a circulating unit superimposed to exhaust atmosphere from said exhaust side sub-chambers and to direct it into said heating side sub-chamber.

TRUMAN H. CLINE.

REFERENCES CITED

The following references are of record in the file of this patent:

UNITED STATES PATENTS

| Number | Name | Date |
|---|---|---|
| 900,821 | Berry | Oct. 13, 1908 |
| 1,218,341 | Truitt | Mar. 6, 1917 |
| 1,657,205 | Ehrgott | Jan. 24, 1928 |
| 2,018,505 | Suhr | Oct. 22, 1935 |
| 2,104,024 | Conboie | Jan. 4, 1938 |
| 2,107,173 | Bauer | Feb. 1, 1938 |